US008121925B1

(12) United States Patent
Ives, Jr.

(10) Patent No.: US 8,121,925 B1
(45) Date of Patent: Feb. 21, 2012

(54) METHOD FOR MANAGING AN INVESTMENT COMPANY

(76) Inventor: E. Russell Ives, Jr., Wyckoff, NJ (US)

( * ) Notice: Subject to any disclaimer, the term of this patent is extended or adjusted under 35 U.S.C. 154(b) by 1226 days.

(21) Appl. No.: 11/056,331

(22) Filed: Feb. 11, 2005

Related U.S. Application Data

(60) Provisional application No. 60/543,394, filed on Feb. 11, 2004.

(51) Int. Cl.
*G06Q 40/00* (2006.01)
(52) U.S. Cl. .................... 705/36 R; 705/35
(58) Field of Classification Search .......... 705/35
See application file for complete search history.

(56) References Cited

U.S. PATENT DOCUMENTS

| | | | |
|---|---|---|---|
| 5,704,045 A | 12/1997 | King et al. | |
| 5,970,479 A | 10/1999 | Shepherd | |
| 6,134,536 A | 10/2000 | Shepherd | |
| 6,157,918 A | 12/2000 | Shepherd | |
| 6,766,303 B2 | 7/2004 | Marshall | |
| 7,266,521 B1 | 9/2007 | Handa et al. | |
| 2001/0037284 A1 | 11/2001 | Finkelstein et al. | |
| 2002/0099640 A1 | 7/2002 | Lange | |
| 2003/0014344 A1 | 1/2003 | Chacko et al. | |
| 2003/0083972 A1* | 5/2003 | Williams | 705/36 |
| 2003/0093354 A1* | 5/2003 | Marshall | 705/36 |
| 2003/0144947 A1* | 7/2003 | Payne | 705/37 |
| 2003/0149657 A1 | 8/2003 | Reynolds et al. | |
| 2004/0138977 A1 | 7/2004 | Tomkins et al. | |
| 2004/0167812 A1 | 8/2004 | Hanney, II | |
| 2005/0044026 A1 | 2/2005 | Leistner | |
| 2005/0044034 A1 | 2/2005 | Perry et al. | |
| 2005/0119962 A1* | 6/2005 | Bowen et al. | 705/37 |
| 2005/0137956 A1 | 6/2005 | Flory et al. | |
| 2005/0203820 A1 | 9/2005 | Dweck et al. | |
| 2005/0228731 A1 | 10/2005 | Coates | |
| 2005/0289036 A1 | 12/2005 | LaCombe, Jr. et al. | |
| 2006/0041490 A1 | 2/2006 | Roberts et al. | |
| 2006/0224492 A1 | 10/2006 | Pinkava | |

OTHER PUBLICATIONS

Global Markets Securities Lending; "Passion: The Power of Partnership Performance: Providing the Perfect Fit"; Deutsche Bank; www.db.com; 13 pages.
Finnerty, John. D.; "The PricewaterhouseCoopers Credit Derivatives Primer: Total Return Swaps"; Publication: The Financier; Publication Date: Mar. 22, 2000; 10 pages.
Saheed, Awan; "Tripartite Repo: A Flexible Friend. (Asset-Liability Management Strategies)"; Publication: The Banker; Publication Date: Nov. 1, 2001; 4 pages.
Derivatives Strategy—Jul./Aug. 96: Legal; "DerivativesStrategy.com"; http://ww.derivativesstrategy.comm/magazine/archive/1995-1996/0796co1.12.asp; 3 pages.

(Continued)

*Primary Examiner* — Hani M Kazimi
*Assistant Examiner* — Hatem Ali

(57) ABSTRACT

Funds are received into an investment company from investors. The investment company approves a counterparty that wants to acquire asset exposure by means of a total return swap and the credit terms for the counterparty, including a derivatives position limit. The investment company the proposed total return swap including an identification of reference assets to which the counterparty wants to acquire exposure. The investment company approves the proposed swap based on availability of the reference assets and on transaction terms of the proposed total return swap. The investment company then purchases the reference assets with the funds and executes the swap with the counterparty. The purchasing of the reference assets and executing of the swap are performed in a manner that precludes the investment company from holding an unhedged position with respect to the reference assets.

14 Claims, 2 Drawing Sheets

OTHER PUBLICATIONS

Finsoft Ltd.; "Credit Derivatives—Total Return Swap"; http://web.archive.org/web20040211024819/http://finsoft.com/solutions/forum_article02.htm; 5 pages.

"International Swaps and Derivatives Association, Inc., Guidelines for Collateral Practitioners"; 70 pages.

"International Swaps and Derivatives Association, Guidance on UK Tax Issues Arising from the Use of the Credir Support Annex—English Law"; 29 pages.

ISDA Margin Survey 2001; 65 pages.

\* cited by examiner

METHOD FOR MANAGING AN INVESTMENT COMPANY

CROSS-REFERENCE TO RELATED APPLICATION

The present application claims priority to U.S. Provisional Application No. 60/543,394, filed Feb. 11, 2004, the contents of which are incorporated herein by reference.

FIELD OF THE INVENTION

The present invention relates generally to investment companies and, in particular, to an investment strategy for minimizing market risk by maintaining virtually all investments in assets whose exposures are shed to approved counterparties that request such exposures.

BACKGROUND OF THE INVENTION

Among several forms of investment companies, one form is open-ended, generally referred to as a mutual fund. These types of funds issue shares to investors in usually unlimited amounts and redeem shares from investors who need liquidity. By law, mutual funds buy and sell shares at net asset value ("NAV"). NAV means total assets owned by the funds less any liabilities divided by the number of shares outstanding. There are many thousands of such funds outstanding.

Since NAV is burdensome to determine at any given time, most funds calculate the NAV at the end of the day. Virtually 99% of funds do this and investors purchase and sell their fund's shares at NAV calculated at the end of the day. The investor typically does not know the price at which shares are purchased and sold until the end of the day, after the trade is executed. Mutual funds are the most common form of investment company.

Derivatives of which a total return swap is one type, are not uncommon and are gradually being used by more investment managers to hedge the risk of an asset in a portfolio or to increase returns from a portfolio through leverage, providing they have been duly authorized. Funds and investment companies use derivatives for those two purposes to complement their overall investment strategies. On the other hand, derivatives have been the cause of some major losses in past years, which results have been well-publicized. In these cases, derivatives were used to take on greater risk for greater returns; they were very complex and not readily understandable. While senior officials at the Federal Reserve System have praised derivatives for innovation in financial markets and implicitly encouraged use, many still fear derivatives. As a result, they are avoided by most investors, especially low risk investors such as money market funds which emphasize safety and liquidity.

Total return swaps provide a means by which investors can gain an exposure to particular assets, called reference assets. The exposure is the same as if the assets were owned directly, including, potential gains in value of that security and any distributions thereon, and at the same time, losses due to any declines in value of the reference asset. In return for receiving the exposure to that asset, the investor typically pays a finance or swap rate on the market value of the reference asset. Typically, that finance rate is a LIBOR-based rate and generally is a means to compensate the payer of the return for the implicit funding cost that it incurs for hedging the swap inclusive of capital allocation costs and for the counterparty credit risk.

The return from having a cash position in the underlying asset for the swap is the same as the return received by the counterparties to the swap. The difference is the LIBOR-based finance rate on the market value of the underlying assets, which is paid to the payer of the return. As an example, if Party A wants the exposure to asset XYZ, it will acquire such through a swap contract with Party B. That contract will provide that Party B pays to Party A the return on XYZ and Party A will pay to Party B a LIBOR based finance rate on the market value of XYZ. The return on XYZ will include the distributions received on XYZ and any increase in the market value of XYZ, meaning the Party B will pay capital gains in XYZ to Party A. But Party B will receive from Party A any decline in value of the XYZ security. The payment exchange will be made daily or another period agreeable by the parties. The amount against which the finance rate is applied is called the notional principal amount of the contract.

As a result of the total return swap and as long as it owns XYZ, Party B is fully hedged for the market value exposure of XYZ. This is the manner in which investors use total return swaps. Party A gains exposure to XYZ by putting up little to no cash except that required by Party B for collateral margins. The advantage to Party A is a leveraged off balance sheet investment. That has the impact of increasing returns to Party A, based upon its total assets. Party B has the advantage of maintaining a perfectly hedged position, has only counterparty credit risk for which it can protect itself in a traditional manner and earns a spread versus its funding cost.

As the most common form of credit derivative in a one trillion dollar credit derivatives market, total return swaps are frequently characterized by regulatory authorities as contracts between beneficiaries and guarantors. They are a form of off balance sheet financial instrument that allows one party who can be termed a beneficiary to transfer the exposure of a reference asset to another party called the guarantor. The beneficiary continues to hold the assets. At the end of a swap or its maturity, the underlying asset is priced for purposes of determining the final swap obligation. At maturity, if the beneficiary had purchased the underlying reference asset specifically to hedge the exposure to a guarantor, then the underlying asset would likely be sold and the selling price would establish the final exchange between the two parties. The underlying asset might in the ordinary course be sold to the guarantor. The final selling priced will be compared to the most recent notional amount of the reference assets for the swap and a difference paid. The standardization of swap procedures is derived from the International Swaps and Derivatives Association master agreement and, in part, is responsible for growth in the marketplace.

Regulators recognize that an ideal hedging strategy is back-to-back trading. These are essentially perfectly offsetting transactions wherein a return is received and a return is paid out. Regulators recognize the unique low risk of the situation where an investor owns the reference assets for the swap because in order for the investor to lose money on the trade, both the counterparty would have to default and the underlying asset would have to drop in value below available margin. The joint probabilities of these events occurring in most cases is extremely low. This is comparable to a repo transaction wherein the counterparty buys an asset and relies upon the seller to repurchase the asset within a certain period. In that same situation, in order for the buyer to lose, both the asset and the counterparty would have to decline in value and default respectively.

SUMMARY OF THE INVENTION

The present invention is directed to a method for managing an investment company. Funds are received into the investment company from a plurality of investors. The investment company approves a counterparty that wants to acquire asset exposure by means of a total return swap and credit terms for the counterparty including a derivatives position limit. The investment company receives, from the counterparty, a proposed total return swap including an identification of one or more reference assets to which the counterparty wants to acquire exposure. The investment company approves the proposed total return swap based on availability of the one or more reference assets identified by the counterparty and on transaction terms of the proposed total return swap. The investment company then purchases the one or more identified reference assets with the funds and executes with the counterparty the proposed total return swap associated with the one or more identified reference assets. The purchasing of the reference assets and executing of the swap are performed in a manner that precludes the investment company from holding an unhedged position with respect to the one or more identified reference assets. The above process is repeated such that a plurality of total return swaps are executed with a plurality of different counterparties. With each counterparty with whom the investment company has executed at least one total return swap, the investment company periodically exchanges for all total return swaps executed with said counterparty, a net difference resulting (i) from an obligation to pay to the counterparty a total return on the one or more reference assets associated with the swap including distributions thereon and (ii) from a right to receive from the counterparty a payment including a finance payment based on a swap rate applied against a market value of the one or more reference assets associated with the swap and a payment for any decline in value thereon. Periodically, the investment company pays an investment return to each of the investors using proceeds from the finance payments received in connection with the executed total return swaps.

The investment company may take several forms including, for example, a mutual fund, a closed end fund, an exchange-traded fund, a private investment fund or a private investment pool. Additionally, instead of an investment company, a bank, SEC registered broker/dealer, OTC derivatives dealer, special purpose trust or entity, or a partnership (e.g., a hedge fund formed as a partnership) could be used for implementing the present invention. Many categories of reference assets may be used for the total return swaps including, for example, loans, securities, market indices, instruments and other investment companies.

In one embodiment, all of the funds from the plurality of investors are used to purchase reference assets associated with the plurality of total return swaps, except for a portion of the funds that are used for a liquidity portfolio. In this embodiment, the investment company periodically pays an investment return to each of the investors using both the proceeds from the finance payments and proceeds from the liquidity portfolio.

DETAILED DESCRIPTION OF THE PREFERRED EMBODIMENT

Figure 1:
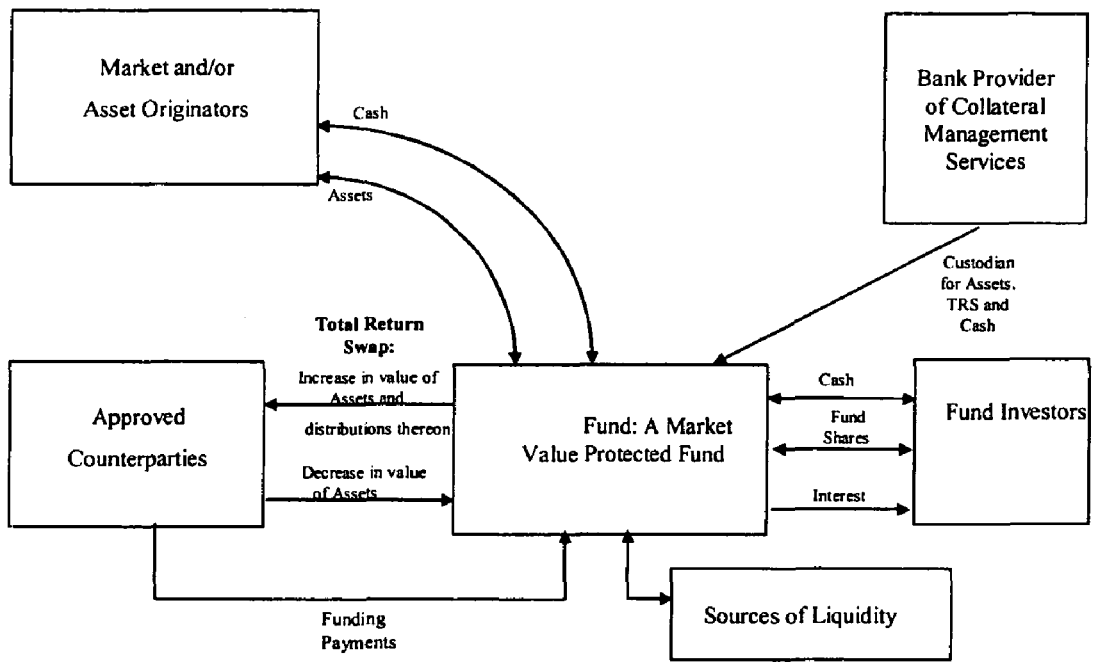
FIG. 1 illustrates the operation of an open-ended fund, in accordance with the present invention.
Figure 2:
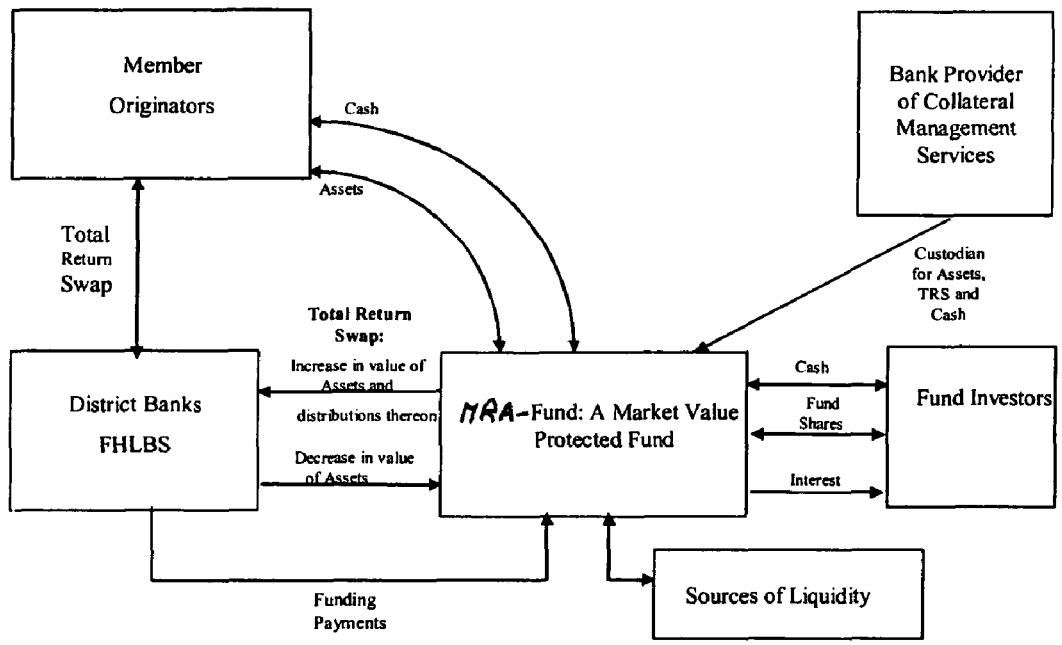
FIG. 2 illustrates the operation of a mortgage-related asset fund, in accordance with an alternate embodiment of the present invention.

In the present invention, funds are received into an investment company from a plurality of investors. The investment company approves a counterparty that wants to acquire asset exposure by means of a total return swap and credit terms for the counterparty including a derivatives position limit. The investment company receives, from the counterparty, a proposed total return swap including an identification of one or more reference assets to which the counterparty wants to acquire exposure. The investment company approves the proposed total return swap based on availability of the one or more reference assets identified by the counterparty and on transaction terms of the proposed total return swap. The investment company then purchases the one or more identified reference assets with the funds and executes with the counterparty the proposed total return swap associated with the one or more identified reference assets. The purchasing of the reference assets and executing of the swap are performed in a manner that precludes the investment company from holding an unhedged position with respect to the one or more identified reference assets. The above process is repeated such that a plurality of total return swaps are executed with a plurality of different counterparties. With each counterparty with whom the investment company has executed at least one total return swap, the investment company periodically exchanges for all total return swaps executed with said counterparty, a net difference resulting (i) from an obligation to pay to the counterparty a total return on the one or more reference assets associated with the swap including distributions thereon and (ii) from a right to receive from the counterparty a payment including a finance payment based on a swap rate applied against a market value of the one or more reference assets associated with the swap and a payment for any decline in value thereon. Periodically, the investment company pays an investment return to each of the investors using proceeds from the finance payments received in connection with the executed total return swaps.

Various steps of the inventive method of the present invention including, for example, the periodic exchanges between the investment company and the counterparties and payment of the investment returns to the investors may be performed automatically using one or more computers. The investment returns are paid to the investors in the form of dividends, distributions or another form of return depending on the form of organization of the payer.

In the present invention, the process of initiating and completing a swap takes on a different perspective from common practice. Traditionally, there are two popular investor objectives for executing swaps, to mitigate risk and to leverage returns. The first objective applies in the case where an investor owns an asset for which it decides to eliminate the asset's market exposure. Since the investor has the asset, the action required is the investor's execution of a matched swap to sell the exposure to a counterparty. The second objective applies in the case of an investor who is seeking to improve portfolio returns through off balance sheet leverage. Here the action required is that the investor must find a counterparty ready, willing and able to sell the required reference asset market exposure, on acceptable terms. In this case, the counterparty who provides the requested exposure to the investor may or may not hold the swap reference asset. Since the only cash investment required by the counterparty is modest collateral margin, the investor has the potential to improve portfolio returns through efficient use of leverage.

In contrast, in an investment company according to the present invention, activity with respect to a swap typically begins with a request from an approved counterparty for a swap exposure. Assuming the request meets the guidelines of the investment company, the investment company will purchase the reference(s) asset for the swap and at substantially the same time will execute the swap with the counterparty. The use of swaps within the investment company differs from common practice in terms of the process, the sequence of events, the perspective and the trigger for activity.

In one embodiment of the present invention, a benefit of the investment company's mode of operation for counterparties is that they will know their position limits and the types of loans and securities acceptable for reference assets. Additionally, they can be more confident that trades can be accomplished with the investment company because of less risk of competing priorities and therefore, they have less concern with warehousing risk for significant periods of time when offsetting trades cannot be found.

The swap contracts used by an investment company in the present invention are functionally similar to short positions, transferring all market exposure in the designated reference assets from the investment company to its swap counterparties. The counterparties want to receive that exposure in exchange for making a money-market-rate-based payment applied against what is termed as a notional principal amount of the reference asset, which, in the present invention, will typically equal the market value of the reference asset. These exposures include not only the right to receive gains in market value and distributions on the reference assets, but also the obligation to pay declines in the market value of reference assets to the investment company. Depending upon counterparty preferences and structuring requirements, distributions received on the reference assets may be reserved in a spread account to offset declines in the notional principal amount of the reference assets and to cover losses, and then paid later. If such credit enhancement is utilized, the swap is frequently called a market value swap rather than a total return swap.

As a result of its investment strategy, the investment company's core assets will be protected from market value changes. Essentially, the primary risk of the investment company becomes the failure of a counterparty to make a contractual payment under the swap agreement. And it is unlikely for the investment company to incur loss unless the reference assets of a swap counterparty decline significantly at the same time that the counterparty defaults, frequently called, in the trade, the double default scenario", one of very low risk.

In one embodiment, the investment company will control its counterparty credit risk by limiting counterparties to creditworthy enterprises and through position limits, swap collateral margins, reference asset approvals, netting by counterparty and termination options.

Revenues for the investment company are generated from the swaps through the "funding leg" payment to be made by the counterparty, buying the exposure. To the exposure buyer, the swap is comparable to having a long cash position, because the contract passes through gains and losses in market value and requires a funding payment, again, similar to a repurchase agreement of a balance sheet position. The funding payment is based upon a negotiated money market rate applied to the market value of the reference assets for the contracts.

In a different characterization of one example of the investment company of the present invention, the investment strategy of the investment company is to create and maximize its holdings of synthetic assets. Synthetic assets are assets whose cash flow and risk characteristics have been modified by means of derivatives. In the case of the investment company, the means are total return swaps. As a result, the investment company presents an investor with the opportunity for portfolio diversification in a fund of synthetic assets.

Example I

Open-Ended Fund

As mentioned above, one type of investment company is an open ended fund or mutual fund. For purposes of illustration, this specification describes an example of an application of the present invention in the context of an open-ended fund. However, it will be understood by those skilled in the art that the present invention may be applied in the context of other types of investment companies. The exemplary open-end fund (the "Fund") has as its objective, a competitive level of current income consistent with the preservation of invested capital and maintenance of adequate liquidity. Operation of the Fund is shown in FIG. 1 and described below.

The Fund sells exposures to approved counterparties and sets swap rates at levels in accordance with policies and the need to balance liquidity. Essentially, the swap rate on the funding leg of the swap is set at levels (i) which cover Fund costs, inclusive of a management fee and (ii) which balance the demand and supply for Fund shares by targeting a particular Fund yield. By so doing, Fund counterparties will essentially pay a swap rate based on the sum of the Fund's fees and expenses and investor yield requirements.

Aside from limited liquidity investments, the Fund will restrict the purchase of core portfolio investments to assets that hedge the swap exposures requested by its counterparties that initiate transactions. This unique operational process and strategy to achieve a zero market value at risk on core assets means that most of the Fund's portfolio investments will essentially be determined by its counterparties, but within Fund parameters of approved assets. Likewise, since the market risk of virtually all of the Fund's assets will have been shed to counterparties, the Funds has essentially only counterparty credit risk.

In contrast to typical money market funds, the Fund holds portfolio investments only in assets which are the reference assets for the swap contracts requested by counterparties. Reference assets for the swap contracts may include virtually any type of loan or security. The contracts will be in the form of ISDA (International Swap Dealers Association) Master Agreements and confirmations documenting specific swap transaction terms. The swap contracts are considered as over the counter derivatives and will not be guaranteed by any clearing agency.

Holding only portfolio investments that exactly match the reference assets for the swaps results in a perfectly hedged position. These investment tactics, combined with planned counterparty risk mitigation practices will result in an anticipated "AAAm" rating for the Fund.

The obligations of the Fund and its counterparties have been described above. Swap payments will be settled daily with each counterparty on a net basis to conserve intraday liquidity by minimizing payment exchange amounts, unless directed otherwise. This practice would be used in a money market fund format where swap rates would likely be set daily, but not necessarily. Swap rates could be set for other periods and exchanges could occur in whatever timeframes were acceptable to the counterparties and investors involved.

At any time, counterparties are able to terminate swaps on reference assets and add new swaps, in accordance with Fund guidelines. Similarly, the Fund will also be able to terminate swaps, but generally would not do so unless to protect against potential loss, which event would be highly unlikely, given the Fund's objective to offer exposures to counterparties who are creditworthy on their own or through credit enhancements that might be arranged. When swaps are terminated, counterparties will have a right of first refusal on the sale of the applicable reference assets. The asset selling price will be used for purposes of determining the final net swap settlement including the sold asset, comparing the sale price to the last price on which an exchange was based, so the Fund remains fully protected against market loss.

The primary source of Fund income will be the swap funding leg payment, which is the product of a money market based rate, i.e., the agreed swap rate, and the notional principal amount or market value of the reference assets. The Fund will negotiate the rate on the funding leg in accordance with management objectives. In addition, some income will be earned on the Fund liquidity portfolio.

Capital preservation is achieved through the swap because the Fund's counterparties provide market value protection by taking on the exposure to reference assets. In fact, bank regulatory guidelines refer to total return swaps as a form of credit derivative that provides for an exchange of exposure to an asset for a money market based return. In the Federal Reserve System's first release on credit derivatives Supervisory Release 96-17, the recipient of the total return in a total return swap is referred to as the "Guarantor". Other guidelines refer to the total return receiver as a protection provider because it pays market value declines. The party receiving this protection is referred to as the beneficiary (i.e., the Fund in the present example), according to Federal Reserve guidelines.

In effect, each Fund swap counterparty guarantees both (i) the market value of related reference asset positions held by the Fund to hedge those swaps and (ii) a return on the notional amount (market value) of the reference assets. For example, if there is a decline in the value of a reference asset in the investment portfolio, the applicable counterparty must pay the amount of that decline to the Fund. Therefore, the value of the Fund is stable, with market value declines in investment positions that are offset by counterparty payments.

Achievement of Fund objectives is dependent upon successful management of swap counterparty credit risk, not investment selection and trading skills, which are critical to most all funds, but only relevant to the Fund's small liquidity portfolio.

The Fund will price its swaps at rates that result in a Fund yield that will attract investment, maintain the value of its shares and balance liquidity to allow for growth and redemptions as the case may be. The two most important factors that determine Fund interest income before expenses are the volume of outstanding swap balances and the rates on the funding legs of the swaps, setting aside the liquidity portfolio.

The Fund will position itself to be a reliable counterparty, available to meet the swap requirements' of its approved counterparties and will generally attempt to maximize its investment in core assets and matched swaps, subject to maintaining adequate liquidity. To achieve this objective, counterparties will be provided the right to substitute swap reference assets which would help to maintain swap balances. In most cases, the Fund will want to avoid swap terminations by encouraging counterparties to substitute other reference assets because the liquidation of swap reference assets will generate excess cash that would have to be placed temporarily in lower yielding liquidity investments. To limit that, the Fund may require approved counterparties to maintain certain minimum swap balances. Further along those lines, the Fund could offer to a counterparty an availability of total swap balances and impose a fee on the unused portion of such availability, comparable to how traditional bank corporate lending facilities are frequently structured.

Unless planned otherwise, the rate on the funding leg of the swaps for each approved counterparty will be negotiated by the Manager. Standard rates may be benchmarked to comparable short term borrowing rates. Depending on Fund strategies, rates on swaps could, for example, be for overnight terms at a spread over applicable repo rates or fixed for limited terms, with pricing at rates based on commercial paper or certificates of deposits.

The primary responsibility of the Fund manager ("the Manager") will be to accommodate approved counterparties' need for asset exposures, to manage credit exposures to counterparties, maintain adequate liquidity and keep the value of Fund shares at par. Among other activities, the Manager will: market the attributes of the Fund to investors, primarily, at least initially, institutional; approve swap counterparties and monitor creditworthiness; establish maximum notional swap amounts ("position limits") for each counterparty; approve reference assets for swaps and set required collateral margins; set funding leg swap rates; confirm swaps when matching reference assets have been purchased; purchase and sell assets, as required to match swap positions; institute procedures to mitigate counterparty credit risk; issue and redeem Fund shares as required; and maintain and develop adequate sources of liquidity, providing funds for growth as needed. Many of these functions serve to distinguish the present invention from the management of existing investment companies.

Credit and market risk of Fund core investments (i.e., swap reference assets) will be shed through swaps to swap counterparties. Swaps will be confirmed only when the core assets have been acquired; no unhedged core positions will be permitted. The Fund will be at risk for its liquidity portfolio, which will be limited to very high grade money market instruments. The liquidity portfolio will be maintained to address funding and liquidity risks that arise from the need for sufficient funds to purchase assets to hedge requested swaps; to make swap payments to counterparties; to provide for redemptions; and to repay borrowings, if any. The Manager must assure the availability of funds to meet these obligations.

Counterparty credit risk is the primary risk of the Fund. At inception and on an ongoing basis, the Manager will select, approve and monitor the creditworthiness of swap counterparties and set swap position limits for each. Swaps will also be limited to those reference assets whose market liquidity and volatility meet established Fund standards and whose value may be verified by third parties. The Manager will have authority to change these elements as conditions warrant and as may be requested by counterparties.

Operational measures are provided to manage and on a dynamic basis control counterparty risk once the counterparties and their position limits are approved. These measures include (i) collateral margins (comparable to margin levels in the repo market); (ii) termination options; and (iii) daily settlements (marks to market) with master netting agreements. To protect against counterparty credit deterioration, the Fund will have the right to terminate swaps; based on Manager discretion, some form of trigger event, such as a rating reduction or large scale redemptions, may be employed. To limit the credit risk of a counterparty, the Fund will mark positions to market daily and settle daily on a net basis with each counterparty. For each counterparty's swaps, increases in market value of reference assets and distributions thereon will be offset by any declines in market value and the funding leg payment so that only a lower net payment will be exchanged. This netting minimizes exposure and conserves liquidity. To protect against loss in the event of a counterparty default, the Fund will establish one way collateral margins based on the price volatility and liquidity of reference assets. Operational risk and other matters will be addressed with customary procedures.

In the event of a failure of a counterparty to make a payment due under its swap contracts, the Fund would, in the ordinary course of business, terminate that counterparty's swaps and liquidate the matching core positions, including related collateral margin. Before a sale of assets into the market, the Fund would offer to sell those assets to its counterparty, under a right of first refusal. That option may result in a more efficient settlement as the selling price determines the final swap settlement exchange.

If reference assets are sold for proceeds at least equal to the notional amount of the swaps (i.e., carrying or market value of assets, taking account of collateral margin as well), there would be no loss to the Fund. Those proceeds would be temporarily held as liquidity investments and then redeployed accordingly in the manner described below.

In the event of a more precipitous decline, resulting in liquidation proceeds less than the full Fund carrying value of the applicable assets, the Fund will incur a shortfall and have loss exposure to the counterparty. However, under the swap contract, the Fund will have the standing of a senior creditor against the defaulting counterparty for any shortfall. The Manager will confine counterparties primarily to creditworthy financial institutions, commercial and consumer finance companies, other investment companies and major investors, among other categories of counterparties.

On the swap side, asset value increases and net new swap positions use Fund cash. Declines in asset values and net swap terminations are sources of cash. Netting will be used to minimize each counterparty's obligations to the Fund. Each counterparty payment will reflect increases and decreases in the prices of applicable reference assets, any distributions on the assets and the funding leg payment. This process not only minimizes potential Fund exposures, but also serves to conserve liquidity, at both Fund and counterparty levels.

Additionally, to further minimize cash needs at the Fund level, the Fund may net payments due from and due to counterparties. This multi-tiered netting concept is accomplished by the Fund using cash due from counterparties to meet net cash obligations due to other counterparties. The overall Fund position from the swap side will be determined through this inter-counterparty netting procedure, thus minimizing sources and uses of cash.

On the Fund shareholder side, the primary source of cash is the degree to which the Fund accepts new funds through issuing new shares; the form and frequency will be controlled by policy and, possibly, by the form of Fund organization (discussed below). The demand for new shares will ultimately be determined by the overall relative attractiveness of the Fund. The redemption of Fund shares will be made in accordance with market practice at net asset value, which will be equal to market value (with the exception of the liquidity portfolio). Dividends will be declared and paid daily in new Fund shares at net asset value, unless appropriate otherwise based on the form of organization.

All sources and uses of cash will be netted, resulting in a cash deficit or surplus. Fund management will assure adequate liquidity to meet obligations, with several possible sources of temporary funding. They include a typical bank line of credit facility or a tri-repo line of credit. Arrangements such as these are common and readily available because they provide a senior claim on assets of the Fund. A sustained cash deficit could be eliminated through issuance of new Fund shares or management of swap terms to moderate swap balances. Any cash surplus would first be used to repay any borrowings. Next, the funds could be invested temporarily within the liquidity portfolio. Any further significant build-up that appears permanent could be used to redeem shares or could be absorbed through management of swap terms to encourage higher swap balances.

The form of Fund organization will in part determine options for providing share liquidity. Among the choices are a registered Rule 2a-7 money market mutual fund. Alternatively, the Fund could be organized as a private unregistered fund, a closed end fund with special periodic issuance and redemption features and others.

An auction pricing arrangement is also feasible for the Fund. The purpose of Dutch auction market pricing is to set a rate of investor return on the security purchased by the investor so that the market value of that security is maintained at its issuance price, at least periodically, which generally means par. With limited exception, each auction generally relates to a specific security and is not used to set a return on a portfolio of securities whose beneficial owners are investors, such as in a mutual fund. That would make no sense because the return on such portfolio securities would already be set by the terms of each instrument. And, there would be no reason to expect that a given portfolio could generate the return required by a market based auction.

In one embodiment, the Fund Manager would manage swap rates to control liquidity needs. In an alternative embodiment, since the Fund would have the authority to set swap rates to achieve a target portfolio return, it could also meet Fund investor yield requirements established by an auction. To implement auction market pricing for the Fund, the Fund could merely announce a need for a given amount of cash to be bought at a price of $1 per share. If the Fund had $20 billion in assets, it would pay investors the lowest auction rate (i.e., the applicable Fund yield) which provided that level of investment from the bidding process. A daily rate or some other periodic rate could be utilized, depending on investor preferences. In this manner, a competitive market process sets the Fund return and that becomes the base to set the swap rate. Investors, dealers and counterparties could all participate and enhance liquidity in the process.

Given a stable market valuation (NAV would only be applicable for the small traditional liquidity portfolio) at $1 per share, a Fund with auction market pricing could also be exchanged traded. That assurance could be facilitated by a daily or periodic auction. Since an auction pricing arrangement assures $1 valuation, intraday exchange trading at the $1 level would be facilitated, further enhancing liquidity options and arbitrage among other comparable investment options, for example, repurchase agreements.

Substantial flexibility exists to create a series of funds that would broaden the appeal of the concepts of the Fund described in the above example. For example, types of counterparties could be broadened as long as they are creditworthy; reference assets could be expanded with other asset classes; and the frequency and method of swap rate resets could be changed to meet other investor requirements. For example, swap rate resets could be overnight, based on the Federal funds rate, LIBOR or short term CD rates. In fact, similar funds could be established based on rollovers of fixed rates. Through combinations of these and other factors, the Manager should be able to reach a variety of market segments to meet a broad range of potential investors.

Example II

Money Market Fund—Focused On Mortgage Related Assets

The example of the present invention described below provides a mechanism for increasing the flow of credit to mortgage originators and investors that are members of the Federal Home Loan Bank System ("the Program"). The Program is compatible with existing System business activity and imposes no new forms of risk not already being incurred. What is different is execution and funding and the benefits that arise. The key to the Program's implementation is a fund with an investment strategy focused on investing in mortgage related assets (MRAs) whose total return may be contractually exchanged for a money market rate of return on the value of those assets.

A fund established in accordance with the teaching of the present invention ("the MRA-Fund") would be the central element in the Program that would be made available by district banks ("District Bank(s) or Bank(s)") of the Federal Home Loan Bank System ("FHLBS or System") for its members. The MRA-Fund would likely be organized as a registered money market mutual fund as described below, with its investments focused on mortgage-related assets.

The value of the Program to the System and its members is that it will generate new options (i) to increase the flow of mortgage credit to members in a manner more capital efficient than advances and to be a securitization alternative and (ii) to facilitate risk mitigation. In doing so, the Program will increase the returns of members' shareholders and it will help the System to achieve its mission by increasing competition and efficiency in secondary mortgage markets.

The MRA-Fund would seek to maximize its positions in mortgage-related assets that are subject to swap agreements with District Banks, i.e., the core assets of the MRA-Fund. It would also maintain adequate liquidity by keeping a minimum portfolio of traditional money market instruments. The MRA Fund will rely on District Banks and members to propose the asset exposures they need and to arrange to acquire the mortgage-related assets in conjunction with a Bank commitment to execute the related swap at the time of asset purchase.

Each swap would require the MRA-Fund to pay the total return of a specific asset to a District Bank (the MRA Fund counterparty) in return for the Bank's payment of a Libor based return, e.g., on the market value of the asset (i.e., the funding leg of the swap) and any declines in the value of the asset. In so doing, the MRA-Fund would swap the market risk and return of its asset position for a variable rate payment on the market value of its asset position.

The MRA-Fund return is therefore based on a short term money market rate and its primary risk is a highly unlikely failure of a District Bank to meet a payment under its swap obligation. Structured in this manner, the MRA-Fund would have a very high degree of safety of principal and, with a competitive yield, would have broad appeal as a short term investment. The MRA-Fund's exposure is comparable to a repurchase agreement with an asset that, on a stand-alone basis, would be ineligible for purchase by a money market fund.

One function of a District Bank is to take on the total return or exposure of MRA-Fund core assets in exchange for making a finance rate payment. In this manner, the Bank provides market value protection on core assets and income to the MRA-Fund. The MRA-Fund must have a swap commitment from a District Bank before settling the purchase of any instrument that would not otherwise be suitable for purchase.

Once the MRA-Fund's asset purchase and swap are executed, the MRA-Fund is perfectly hedged with no market risk. The Bank receiving the total return may retain the exposure for its own account or sell it through a matched swap to a member or to other Banks. If the Bank retains the total return, either for investment or for inventory and later resale, its position is comparable to a balance sheet position except for the off-balance-sheet form of execution.

If not planning to retain the exposure, the Bank would likely have already made an arrangement with a member to take on the exposure through a matching swap. In fact, the purchaser could be the originator and seller of the assets to the MRA-Fund, or it could be another member or District Bank. If the exposure is sold to the originator, one would expect the Bank's spread for intermediation to be nominal.

If the Bank sells a matching swap to another member or other District Bank, the Bank will earn a spread based on the different finance rates on the funding leg of each swap. To the Bank, the rate on the swap with the MRA-Fund represents interest expense and the rate on the swap selling the exposure represents interest income.

In addition, the District Bank will have the opportunity to earn fees/spread for credit enhancement or risk mitigation, depending upon the preferences of its counterparty end investor. For example, to accommodate those diverse needs, the Bank could absorb selected risks of an asset or portfolio that it may be better able to assume or to lay off to third parties, as it does in other business activity with dealers. Some of the credit enhancement options available in the System's Mortgage Partnership Finance and Mortgage Purchase Programs could be utilized.

Additionally, a Bank or several Banks could assemble a portfolio of exposures from different geographic regions and offer members a total portfolio return with geographic diversification. An intra-Bank trading market could eventually be developed.

Members may have several opportunities to participate in the Program. First, they will have ready access to swaps as a more efficient means for investing in mortgage assets, including loans and securities. While swaps are generally available in an over-the-counter dealer market, they may be difficult to find on a timely basis, may not always be available and can be expensive because of the counterparty's capital cost, i.e., a rent for using a counterparty's balance sheet. With the MRA-Fund as its central element, the Program brings down the cost of swaps essentially to a cost plus basis. The key determinant of that cost is the MRA-Fund yield, which will be based on a competitive money market rate but it does not include any capital cost element to raise the swap finance rate. In the framework of a cooperative, the Program creates an opportunity to pass through the low cost and efficiency of the MRA-Fund to members.

While the reference assets for swaps may come from virtually any asset class, the Program would likely focus on mortgage whole loans, both conforming and non-conforming, but also include collateralized mortgage obligations, Ginnie Maes and other mortgage-backed securities. Using swaps to purchase any of these exposures means recording the market value of the swap contracts on balance sheet, not the notional value of the reference assets for the swaps. As a result of the GAAP accounting treatment, swaps provide leverage and capital efficiency as investments and they improve performance measures. Essentially, swaps permit greater utilization of real economic capital without being GAAP balance sheet constrained.

One method to assess the value of the efficiency from "freeing-up" GAAP balance sheet capacity is to calculate potential earnings from the "newly available" capital. Given a target equity ratio of 6% and a target pretax return on equity of 30%, the benefit of the pretax spread income potential created is 180 basis points. This assumes that the Program swap rate and related costs are comparable to on-balance-sheet costs.

To elaborate in terms of bank regulatory capital requirements, swaps are subject only to regulatory risk based capital requirements and not to the leverage capital requirement. For example, on a Fannie Mae mortgage-backed security, a bank is required to hold a minimum of 1.6% in risked based capital because the asset is in the 20% risk weight and the bank risk based capital requirement is 8%. However, balance sheet investments, irrespective of credit and market risk, are also subject to a regulatory leverage capital requirement and most banks target a 5% to 6% Tier 1 ratio to be regarded as well-capitalized. As a result, the capital allocated for the Fannie Maes is 5-6%, not 1.6%. The extra 4% capital allocation is very costly.

In contrast, a swap execution effectively providing the same exposure, requires only 1.6% capital because swap exposures are not subject to a leverage capital requirement. That saves 4% capital, which now may be used for other new business investment. If the target return on equity is 30% pretax, for example, a member could save 120 basis points in cost of regulatory capital allocation (30% of cost on a 4% less equity allocation). The savings would be 180 basis points for GNMAs because of the zero risk weight.

The lower the risk weight of the asset, the greater the burden of the leverage capital requirement and the greater the swap advantage over a balance sheet position. This impact will become more pronounced when Basel 2 takes effect. Among its objectives, Basel 2 attempts to conform regulatory risk based capital requirements to real economic capital allocations derived from internal models. Since internal capital allocations are generally below regulatory requirements for a given portfolio, the risk based capital requirement could decline for many banks. That will make the leverage capital requirement potentially more burdensome for those banks.

The better able an institution is to invest based on its own internal economic models for allocating capital to cover risk and to be unconstrained by balance sheet appearances and peer comparisons, the greater will be shareholder risk-adjusted returns.

The Program may also be used as an alternative to traditional mortgage securitization. As a complement to what is done in the System's Mortgage Partnership Finance and the Mortgage Purchase Programs, members could originate pools of mortgages directly onto the books of the MRA-Fund (rather than a District Bank). A Bank would prearrange to do the swap and could incorporate the requisite credit enhancement and tranching if requested, before doing the matched swap with the originating member, or other member. The Program is sufficiently flexible to accommodate these member preferences.

With enhancements to the matched swap that could bring the risk weight to 20% from the typical 50% for mortgages, the buyer will achieve a higher level of capital efficiency unburdened by the leverage ratio. However, even without FHLB enhancement and a 50% risk weight for typical mortgages, capital requirements will be reduced below common leverage capital targets.

Because of the lack of ready alternatives, Program benefits increase meaningfully when application is expanded to nonconforming product, a significant competitive advantage of the Program for the Banks and members.

If a member has contact with investors (e.g., insurance companies, state public pension funds) that buy mortgage product, it could offer these investors a swap to match the swap it has with its District Bank. While this type of strategy adds another layer of intermediation, it could represent valuable spread business to a member with distribution capabilities. A potential added benefit is that investors will frequently pay more for a swap exposure because of the implicit leverage, the capital efficiency and the improved performance ratios with off balance sheet treatment.

Importantly, the capital needed to support this strategy arises only from counterparty credit risk, with no market exposure—a pension fund on one side and a member on the other, for example. Any counterparty risk would be fully collateralized. As a result, this strategy could generate a very high return on allocated capital.

The Program's scope of business is believed to be compatible with bank and Federal Housing Finance Board regulations. In addition, the Program's benefits are well-timed with the evolution in the Banks' capital structures and with the needs of members for more efficient mortgage investment and greater secondary market competition. The Program has the potential to add a new dimension of liquidity to the mortgage marketplace, increase capital efficiency and enhance competition in the secondary market.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A computer-implemented method for managing an investment company, comprising:

(a) receiving funds into the investment company from a plurality of investors who, in return, receive shares or interests in the investment company for their investment;

(b) approving, by the investment company, a counterparty that wants to acquire asset exposure by means of a swap and credit terms for the counterparty, including a derivatives position limit, using the computer programmed to evaluate at least the creditworthiness of the counterparty;

(c) receiving, from the counterparty, a proposed swap including an identification of one or more reference assets to which the counterparty wants to acquire exposure;

(d) approving, by the investment company, the proposed swap using the computer programmed to evaluate the proposed swap based on availability of the one or more reference assets identified by the counterparty and on transaction terms of the proposed swap;

(e) after steps (b)-(d), purchasing the one or more identified reference assets with the funds and executing with the counterparty the proposed swap associated with the one or more identified reference assets, wherein these trades and contractual obligations are processed and confirmed by the computer and wherein said purchasing and executing are performed in a manner that precludes the investment company from holding an unhedged position with respect to the one or more identified reference assets which process enables the investment company to eliminate market risk on its shares;

(f) repeating steps (b)-(e), whereby a plurality of swaps are executed and processed by the computer with a plurality of different counterparties;

(h) with each counterparty with whom the investment company has executed at least one swap, periodically exchanging for each swap executed with said counterparty, a net difference resulting (i) from an obligation to pay to the counterparty a total return on the one or more reference assets associated with the swap including distributions thereon and (ii) from a right to receive from the counterparty a payment including a finance payment based on a swap rate applied against a market value of the one or more reference assets associated with the swap and a payment for any decline in value thereon, wherein the net difference is calculated using the computer programmed to calculate the net difference; and (i) periodically paying an investment return to each of the investors calculated by the computer as using at least proceeds from the finance payments received in connection with the executed swaps, which return on the shares of the investment company purchased by investors will have no market risk as enabled by the method for managing the investment company.

2. The computer-implemented method of claim 1, wherein the swap rate comprises a negotiated rate and that rate is used by the computer for calculating respected amounts due.

3. The computer-implemented method of claim 1, wherein the investment company is a mutual fund.

4. The computer-implemented method of claim 1, wherein the investment company is a closed end fund.

5. The computer-implemented method of claim 1, wherein the investment company is an exchange-traded fund.

6. The computer-implemented method of claim 1, wherein the investment company is a private investment fund.

7. The computer-implemented method of claim 1, wherein the investment company is a private investment pool.

8. The computer-implemented method of claim 1, wherein the one or more reference assets are selected from the group consisting of: loans, securities, market indices, instruments and other investment companies.

9. The computer-implemented method of claim 1, wherein all of the funds from the plurality of investors are used to purchase reference assets, as processed and confirmed by the computer, associated with the plurality of total return swaps, except for a portion of the funds that are used for a liquidity portfolio.

10. The computer-implemented method of claim 9, wherein step (i) comprises:

(i) periodically paying an investment return calculated by the computer to each of the investors using at least proceeds from the finance payments received in connection with the executed total return swaps and proceeds from the management of a liquidity portfolio.

11. The computer-implemented method of claim 1, wherein for each counterparty with whom the investment company has executed a plurality of swaps, periodically exchanging for all swaps executed with said counterparty, a net difference, calculated by the computer, resulting (i) from an obligation to pay to the counterparty a total return on the reference assets associated with the plurality of swaps executed with said counterparty including distributions thereon and (ii) from a right to receive from the counterparty a payment including a finance payment based-on a swap rate applied against a market value of the reference assets associated with the swaps executed with said counterparty and a payment for any decline in value thereon.

12. The computer-implemented method of claim 1, wherein the swap in step (b) is a total return swap, and the proposed swap in steps (c)-(d) is a proposed total return swap.

13. The computer-implemented method of claim 1, wherein the swap in step (b) is a market value swap, and the proposed swap in steps (c)-(d) is a proposed market value swap.

14. A computer-implemented method for managing a financial entity selected from the group consisting of: a bank, SEC registered broker/dealer, OTC derivatives dealer, special purpose trust, special purpose entity, or partnership, the method comprising:

(a) receiving funds into the financial entity from a plurality of investors who, in return, receive shares or interests in the entity for their investment;

(b) approving, by the financial entity, a counterparty that wants to acquire asset exposure by means of a swap and credit terms for the counterparty, including a derivatives position limit, using the computer programmed to evaluate at least a creditworthiness of the counterparty;

(c) receiving, from the counterparty, a proposed swap including an identification of one or more reference assets to which the counterparty wants to acquire exposure;

(d) approving, by the financial entity, the proposed swap using the computer programmed to evaluate the proposed swap based on availability of the one or more reference assets identified by the counterparty and on transaction terms of the proposed swap;

(e) after steps (b)-(d), purchasing the one or more identified reference assets with the funds and executing with the counterparty the proposed swap associated with the one or more identified reference assets, wherein these trades and contractual obligations are processed and confirmed by the computer and wherein said purchasing and executing are performed in a manner that precludes the financial entity from holding an unhedged position with respect to the one or more identified reference assets which process enables the entity to eliminate market risk on its shares or interests:

(f) repeating steps (b)-(e), whereby a plurality of swaps are executed and processed by the computer with a plurality of different counterparties;

(h) with each counterparty with whom the financial entity has executed at least one swap, periodically exchanging for each swap executed with said counterparty, a net difference, resulting. (i) from an obligation to pay to the counterparty a total return on the one or more reference assets associated with the swap including distributions thereon and (ii) from a right to receive from the counterparty a payment including a finance payment based on a swap rate applied against a market value of the one or more reference assets associated with the swap and a payment for any decline in value thereon, wherein the net difference is calculated using the computer programmed to calculate the net difference; and (i) periodically paying an investment return to each of the investors calculated by computer using at least proceeds from the finance payments received in connection with the executed swaps, which return on the shares or interests of the entity purchased by investors will have no market risk as enabled by the method for managing the financial entity.

* * * * *

UNITED STATES PATENT AND TRADEMARK OFFICE
CERTIFICATE OF CORRECTION

PATENT NO. : 8,121,925 B1  
APPLICATION NO. : 11/056331  
DATED : February 21, 2012  
INVENTOR(S) : E. Russell Ives, Jr.

Page 1 of 1

It is certified that error appears in the above-identified patent and that said Letters Patent is hereby corrected as shown below:

Title Page, Item 57, in the ABSTRACT, Lines 5-8, four words were left out in the third sentence. The third sentence should read as corrected below:

...The investment company <u>receives from the counterparty</u> the proposed total return swap including an identification of reference assets to which the counterparty wants exposure.

Signed and Sealed this  
Ninth Day of April, 2013

Teresa Stanek Rea  
*Acting Director of the United States Patent and Trademark Office*